United States Patent [19]

Den Hartog

[11] Patent Number: 5,000,466
[45] Date of Patent: Mar. 19, 1991

[54] VEHICLE

[76] Inventor: Maarten A. N. Den Hartog, Sterrenhof 7, 3511 EV Utrecht, Netherlands

[21] Appl. No.: 425,326

[22] Filed: Oct. 23, 1989

[30] Foreign Application Priority Data

Oct. 25, 1988 [NL] Netherlands ............... 8802623

[51] Int. Cl.⁵ .................................................. B62B 9/04
[52] U.S. Cl. .................................. 280/21.1; 280/22.1; 280/28.11; 280/845
[58] Field of Search ............ 280/845, 21.1, 22.1, 280/28.15, 28.16, 28.11, 14.1, 16, 15, 26, 661, 96.1

[56] References Cited

U.S. PATENT DOCUMENTS

| | | | |
|---|---|---|---|
| 1,453,948 | 5/1923 | Pottala | 280/16 |
| 2,435,814 | 2/1948 | Allison | 280/96.1 |
| 3,190,671 | 6/1965 | Fabris | 280/21.1 |
| 4,036,506 | 7/1977 | Scheib | 280/22.1 |
| 4,334,691 | 6/1982 | Scheib | 280/14.1 |

FOREIGN PATENT DOCUMENTS

| | | |
|---|---|---|
| 0005485 | 11/1979 | European Pat. Off. . |
| 1530956 | 12/1970 | Fed. Rep. of Germany . |
| 3628111 | 3/1988 | Fed. Rep. of Germany . |
| 3702092 | 8/1988 | Fed. Rep. of Germany ..... 280/22.1 |

OTHER PUBLICATIONS

"Swingrodel" Flyer, 10/1983.

Primary Examiner—Charles A. Marmor
Assistant Examiner—Eric Culbreth
Attorney, Agent, or Firm—Young & Thompson

[57] ABSTRACT

Ski device having two ski members interconnected to a support. The connection is realized by at least two pivot arms, a front one and a rear one. The front pivot arm is shorter than the rear one whilst the front pivot point is nearer to the axis of the vehicle than the rear pivot point of each ski member.

2 Claims, 3 Drawing Sheets

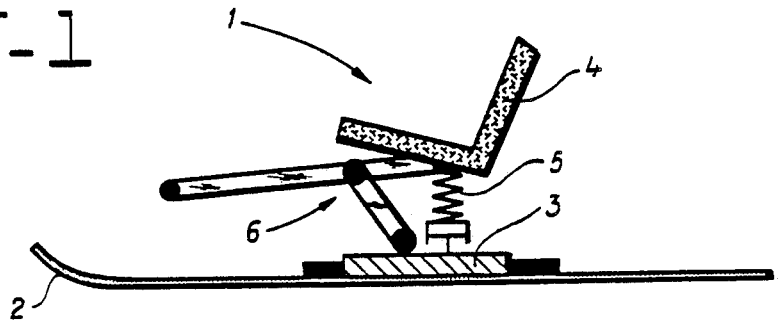
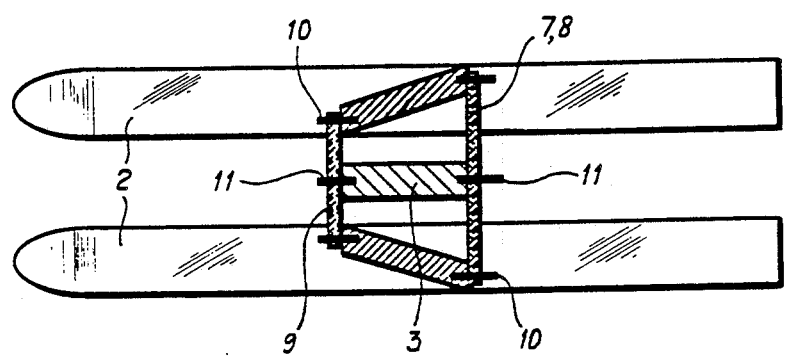
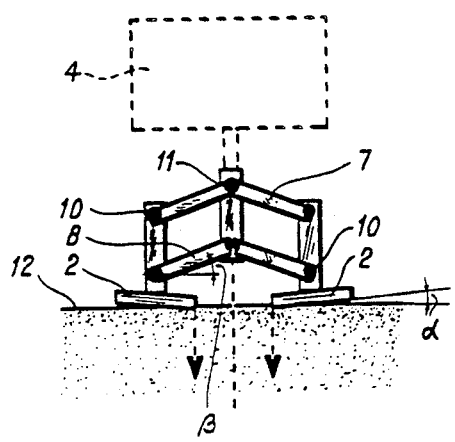
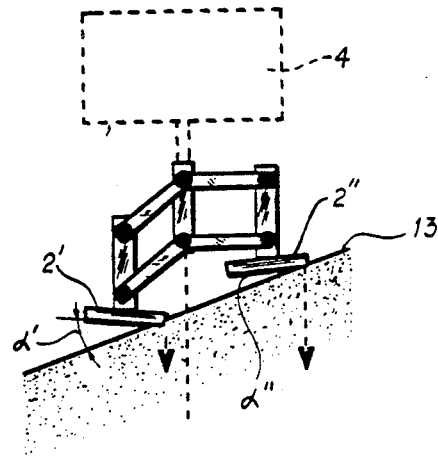

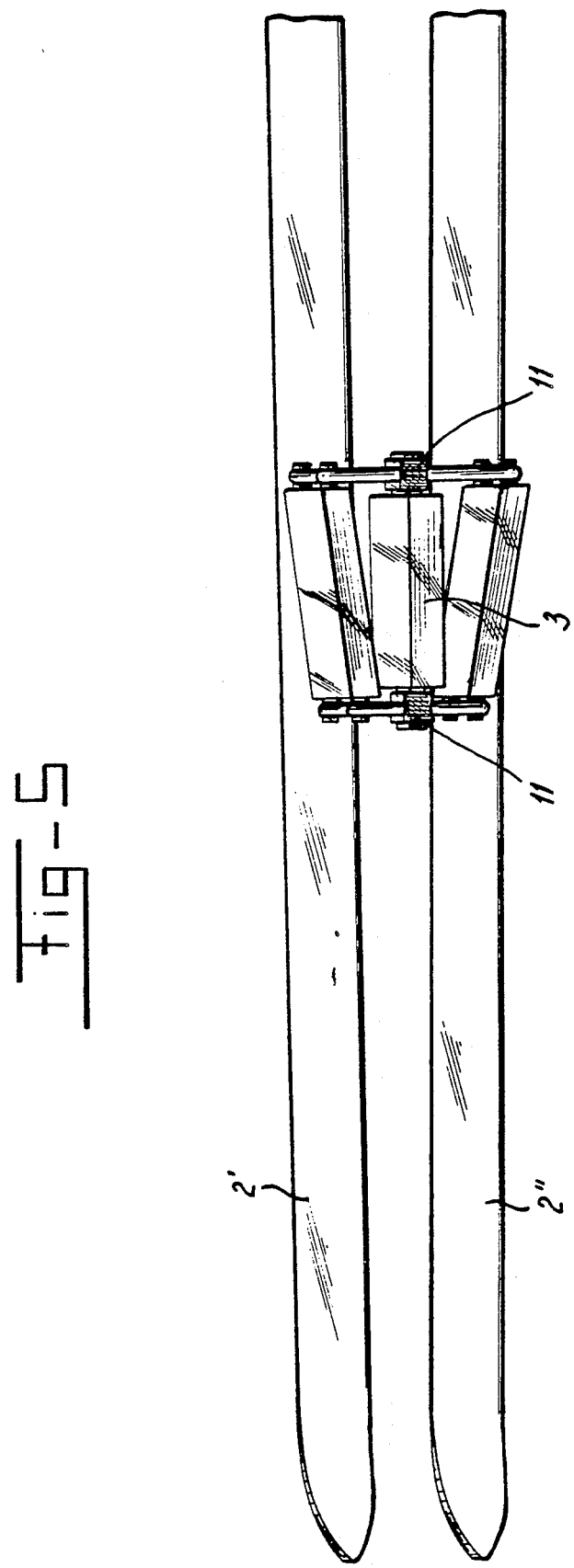

VEHICLE

The subject invention relates to a vehicle, comprising two ski members, to be contacted with the supporting surface, along which movement is realized, wherein said two ski members are each connected at at least two positions one behind the other in the direction of movement by pivot means to a support, said support provided between the ski members, wherein the distance between the pivot points on the ski members at the pivot point being most forward in the direction of movement is smaller than said distance at the pivot point more rearward in the direction of movement, wherein the pivot means comprise rigid pivot arms, being at the extremity pivotally connected to the ski members and in the center with the support and wherein the front pivot arm is shorter than the rear one.

Such a vehicle is known from German patent specification DE-A-1 530 956. Therein the ski members are curved at the front side not only in upward direction but also in inward direction. The support is connected with the ski members through a pivot provided on each of the ski members. The position of the ski members relative to the support can be adjusted with grips. During rotation of these grips the ski members rotate somewhat inwardly such that a self-controlling effect is obtained. If optimal skiing is to be attained the axis of pivoting has to be parallel with the tangent of the inner-lower side of the ski member. In this device no fixed relationship exists between the support and the ski members.

The subject invention aims to provide such a fixed relationship and to furthermore obtain a more optimal position of the ski members during taking of curves.

This aim is realized with the vehicle described above in that the pivot means comprise rigid pivot arms, at the extremity pivotally connected to the ski members and in the center to the support and wherein the front pivot arm is shorter than the rear one. By using pivot arms instead of single pivots, such as described in the above prior art, said pivots arms being rigid and providing a well defined positioning of the support relative to the ski members in different angle positions of the support, the fixed relationship described above is realized. As the front pivot arm is shorter than the rear one, during taking of bends with the vehicle, it is provided that the ski members move toward each other at the front side and move away from each other at the rear side and it is generally accepted that this is the most desirable position.

It is remarked that from the German Offenlegungsschrift 3,628,111 a vehicle is known having pivot arms. However, it makes no reference to two pivot points, but only to one pivot point for each ski member, such that the effect realized with the subject invention comprising moving toward each other of the front sides of the ski members during movement through a bend can never be obtained.

U.S. Pat. No. 3,190,671 (Fabris) discloses a structure comprising pivot arms, however, the length of these arms is equal to each other or in contrast to the subject application the rearward pivot arms are shorter than the forward ones. Because the device described in the U.S. specification differs from the device from the subject application the effect obtained will also completely differ.

According to a preferred embodiment of the invention the pivot means comprise at at least the rearward pivot point two substantially parallel extending pivot arms arranged above each other and spaced in the direction perpendicular to the plane of movement and wherein in the position of use the upper pivot arm is shorter than the lower one. Because of this it is realized that during tilting of the support, i.e. during moving in bends with ski members the downhill ski will obtain another position than the uphill ski. The downhill ski on which most pressure is exerted does tilt somewhat more and engages better in the snow such that better ski properties are obtained.

To control movement of the support with regard to the ski members, according to a further preferred embodiment movement controlling means can be provided. These can comprise a friction assembly engaging the pivot axis of the support. According to a further preferred embodiment the ski members include in the non-loaded position with regard to the axis of the ski member an acute angle with the line perpendicular to the direction of movement in the plane of movement. Because of this a self controlling effect is obtained.

By placing the pivot arms with an angle relative to the horiontal plane of movement, preferably ±20°, it is realized that during rotation of the pivot mechanism the line of gravity of the support and the person being thereon in a bend extends to the ski member in the outer bend.

The vehicle described above can be used as such but can also be coupled with such a vehicle, wherein the rearward vehicle of the tandem is placed reversed.

The invention will be further elucidated referring to preferred embodiments shown in the drawings as an example and wherein:

FIG. 1 shows in side elevation a vehicle having ski members according to the invention;

FIG. 2 shows a plan view of the device according to FIG. 1;

FIG. 3 shows a rear end view of the device according to FIG. 1 arranged on a horizontal plane;

FIG. 4 shows a rear view of the device according to FIG. 1 on an inclined base;

FIG. 5 shows a plan view of the device according to FIG. 4;

Figure 6:
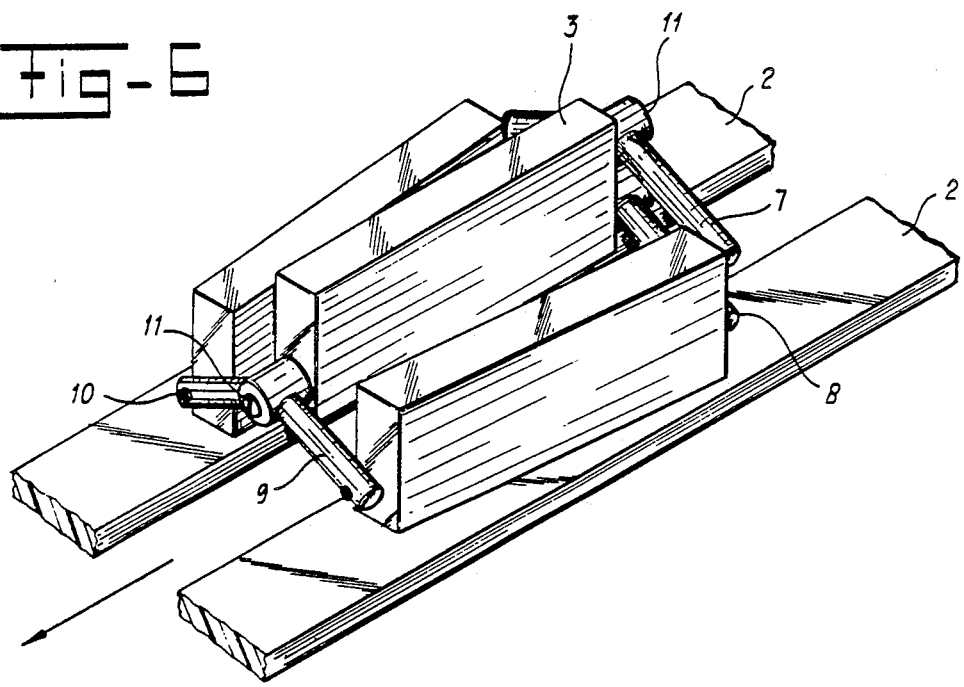
FIG. 6 shows a further embodiment of the vehicle according to FIG. 1.

In FIG. 1 a vehicle according to the invention is shown generally indicated with 1. As is clear from the figure the ski members are referred to with 2. As is clear from FIG. 2 between the ski members a support 3 is provided. As is clear from FIG. 1 on said support 3 a seat 4 is provided. This seat 4 is connected with support 3 through a spring mechanism 5 and a guiding mechanism generally referred to with 6. Support 3 is connected through at least three pivot arms with ski members 2. The rearward pivot arms are indicated with 7,8 (see FIG. 3) whilst the forward pivot arm is referred to with 9. These arms pivot around pivot points 10 on the ski members and pivot points 11 on the support. From FIG. 3 it is clear that the geometry of the arms 7 and 8 is chosen such that ski members 2 lying on a horizontal plane 12 include a small angle α with this horizontal plane. This angle is of importance because during movement of the ski member along an inclined surface 13 the angle α' of the downhill ski member 2' will be larger than the angle $\alpha''$ of the uphill ski member. Because of this the downhill ski member does more sharply engage the snow resulting in more grip to the snow and the uphill ski does engage less such that it can slide more easily. Such an effect can also be obtained by embodying upper arm 7 shorter than the lower one. In this case angle $\alpha$ with the horizontal plane can be 0°. From FIG. 2 it is clear that the distance from pivot point 10 on the ski member to the pivot point 11 of the support for the lower pivot arm 9 is smaller than for the rear pivot arms 7,8. Because of this it is realized that during oblique positioning of the support relative to the ski members during movement over a slope, such as shown in FIG. 4, the front extremities of the ski members 2 move toward each other and the rearward extremities move away from each other. By moving upwardly and downwardly the ski member relative to each other the front extremities of the ski members move with regard to each other. Furthermore the center axis of the supports moves from the center of the ski members 2' and 2" as is clear from FIG. 4. The angle $\alpha$ is preferably about 2°. From FIG. 3 it is also clear that arms 7 and 8 include an angle o with the horizontal, preferably $\pm 20°$. Because of this during rotation of the pivot mechanism the line of gravity of the support is displaced.

In FIG. 5 in plan view the device according to FIG. 4 is shown. It is clear that during movement around a bend the front extremities of the ski members 2' and 2" move somewhat toward each other such that the bend can taken more easily.

In FIG. 6 schemically an embodiment of the invention is shown. The pivot points 11 of the arms 8 and 9 comprise a pin or such and between arms 8 and 9 of the support a friction damper is provided such that controlling of the ski members is realized. This controlling of the movement can also be obtained by a torsion spring, engaging the pivot axle of the support (not shown).

Figure 7:
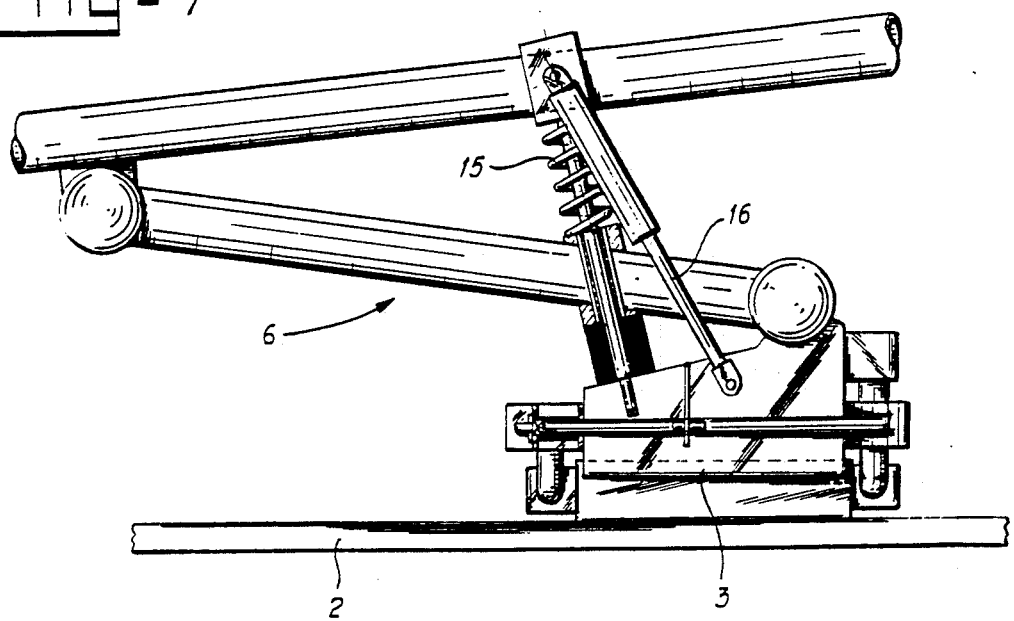
FIG. 7 shows the connection of a spring mechanism provided on the support.

In FIG. 7 schematically the guiding assembly 6 connected to the support 3 is shown in more detail. This comprises in this embodiment a spring mechanism 15 and a shock damper 16.

Because the forward ends of the ski members move toward each other during taking of bends whilst also more pressure is exerted on the downhill ski member, this mechanism gives a controlling effect. Relative to mono ski members this is a considerable advantage because in that device no controlling effect is obtained.

Although the invention is descibed above referring to prefered embodiments, it has to be understood that many modifications can be realized without leaving the scope of protection of the subject application as defined in the appended claims. E.g. means can be provided to urge the support in the center position, however, laid out such that the advantageous effect obtained by the invention is not lost.

I claim:

1. A vehicle comprising two elongated ski members disposed in side-by-side relation, a support between and above the ski members, and front and rear rigid pivot arms pivotally interconnecting the ski members with the support, there being a pair of front pivot arms that are upwardly inclined toward each other when said ski members are at the same level and pivoted at outer lower ends to said ski members and at upper inner ends to said support, there being two pairs of rear pivot members, one pair of said rear pivot members being disposed above the other pair of said rear pivot members and being shorter than said other pair of rear pivot members, said rear pivot members being inclined upwardly toward each other when said ski members are at the same level and pivoted at lower outer ends to said ski members and at upper inner ends to said support, said front pivot members having pivotal interconnection with said ski members at points spaced apart a first distance, said other pair of rear pivot members having pivotal interconnection with said ski members at points that are spaced apart a second distance, said first distance being less than said second distance.

2. A vehicle as claimed in claim 1, said ski members having inner and outer edges, said inner edges being lower than said outer edges when said ski members are disposed at the same level.

* * * * *